US012659523B2

(12) United States Patent　　　　(10) Patent No.:　US 12,659,523 B2
Wang　　　　　　　　　　　　　　　　(45) Date of Patent: 　　Jun. 16, 2026

(54) METHOD AND APPARATUS FOR SCHEDULING A BACK-RESOURCE LINK, ELECTRONIC DEVICE, AND STORAGE MEDIUM

(71) Applicant: BEIJING BAIDU NETCOM SCIENCE TECHNOLOGY CO., LTD., Beijing (CN)

(72) Inventor: Chenfei Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 106 days.

(21) Appl. No.: 18/747,103

(22) Filed: Jun. 18, 2024

(65) Prior Publication Data

US 2025/0008168 A1　　Jan. 2, 2025

(30) Foreign Application Priority Data

Dec. 20, 2023　(CN) .......................... 202311766528.5

(51) Int. Cl.
　　*H04N 21/2187* 　　(2011.01)
　　*H04N 21/231* 　　(2011.01)
　　*H04N 21/239* 　　(2011.01)
(52) U.S. Cl.
　　CPC ... *H04N 21/2187* (2013.01); *H04N 21/23106* (2013.01); *H04N 21/2393* (2013.01)

(58) Field of Classification Search
　　CPC ......... H04N 21/2187; H04N 21/23106; H04N 21/2393; H04N 21/2181; H04N 21/26216; Y02D 30/70; H04L 45/121; H04L 45/125
　　See application file for complete search history.

(56) 　　　　References Cited

FOREIGN PATENT DOCUMENTS

| CN | 109600373 B | * | 8/2021 | ............. H04L 65/75 |
| CN | 115002497 B | * | 3/2024 | ......... H04N 21/2187 |

OTHER PUBLICATIONS

English translation of CN 115002497 B (Year: 2024).*
English translation of CN 109600373 B (Year: 2021).*

* cited by examiner

*Primary Examiner* — Gigi L Dubasky
(74) *Attorney, Agent, or Firm* — Osha Bergman Watanabe & Burton LLP

(57) 　　　　　ABSTRACT
A method for scheduling a return-to-origin link includes: constructing a custom data frame; adding the custom data frame to live data to be transmitted, and distributing the live data by a first return-to-origin link to edge nodes which receive a play request of each user; requesting to employ a second return-to-origin link to perform return-to-origin operation in response to detecting that a line traffic corresponding to any edge node in the edge nodes which receive the play request of the each user exceeds a preset threshold; and integrating the live data transmitted by the first return-to-origin link and live data transmitted by the second return-to-origin link, and distributing integrated live data to the each user.

20 Claims, 6 Drawing Sheets data frame sequence of a regular live stream data frame sequence of a live stream with
information of a push stream node

METHOD AND APPARATUS FOR SCHEDULING A BACK-RESOURCE LINK, ELECTRONIC DEVICE, AND STORAGE MEDIUM

CROSS-REFERENCE TO RELATED APPLICATIONS

This application is based upon and claims benefit of priority to a Chinese Patent Application 2023117665285, filed on Dec. 20, 2023, the entire contents of which are incorporated herein by reference.

TECHNICAL FIELD

The disclosure relates to a field of artificial intelligence technologies, particularly to a field of cloud computing and cloud storage technologies, and more particularly to a method and an apparatus for scheduling a return-to-origin link, an electronic device and a storage medium.

BACKGROUND

Taking a live application scenario as an example, for a live content delivery network (CDN), edge CDN nodes generally receive a push stream request from a performer and a play request from a user. The edge CDN node receiving the push stream request from the performer may transmit stream data to a central origin server. The edge CDN node receiving the play request from the user obtains the stream data from requesting the central origin server and distributes the stream data to a live viewer to view.

Since there may be multiple nodes in a link from the performer to the viewer, with the more links, the more delay is introduced.

SUMMARY

The disclosure provides a method and an apparatus for scheduling a return-to-origin link, an electronic device and a storage medium.

According to a first aspect of the disclosure, there is provided a method for scheduling a return-to-origin link, including:

constructing a custom data frame, the custom data frame including address information of a push stream node;

adding the custom data frame to live data to be transmitted, and distributing the live data by a first return-to-origin link to edge nodes which receive a play request of each user;

requesting to employ a second return-to-origin link to perform return-to-origin operation in response to detecting that a line traffic corresponding to any edge node in the edge nodes which receive the play request of each user exceeds a preset threshold, the second return-to-origin link being shorter than the first return-to-origin link; and integrating the live data transmitted by the first return-to-origin link and live data transmitted by the second return-to-origin link, and distributing integrated live data to the user.

According to a second aspect of the disclosure, there is provided an electronic device, including:

at least one processor; and a memory, communicatively coupled to the at least one processor.

The memory is configured to store instructions executable by the at least one processor. When the instructions are executed by the at least one processor, the at least one processor is caused to execute the method of any of the above technical solutions.

According to a third aspect of the disclosure, there is provided a non-transitory computer-readable storage medium having computer instructions stored thereon. The computer instructions are configured to cause a computer to execute the method of any of the above technical solutions.

It should be understood that the content described in this section is not intended to identify key or important features of the embodiments of the disclosure, nor is it intended to limit the scope of the disclosure. Additional features of the disclosure will be easily understood from the following description.

BRIEF DESCRIPTION OF THE DRAWINGS

The accompanying drawings are used to better understand this solution and do not constitute a limitation to the disclosure, in which.

DETAILED DESCRIPTION

Figure 1:
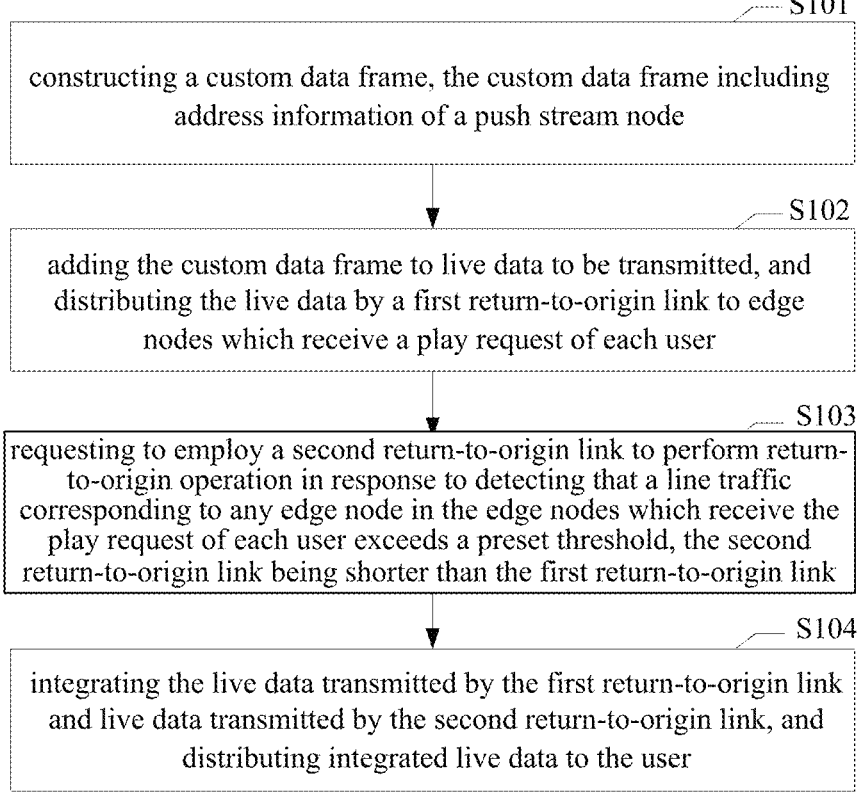
FIG. 1 is a flow chart illustrating steps of a method for scheduling a return-to-origin link in embodiments of the disclosure.

Description will be made below to exemplary embodiments of the disclosure with reference to accompanying drawings, which includes various details of embodiments of the disclosure to facilitate understanding, and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

In the related art, one way of return-to-origin operation is to employ a relatively fixed return-to-origin link, that is, through some fixing strategies, an edge content delivery network (CDN) node is enabled to return to request some fixed upper-layer nodes or directly to return to request a central origin server. Such scheduling is rough relatively and is generally at a domain name level (a live request universal resource locator (url) is generally in the form of domain/app/stream). The domain name level means that a same type of link is employed for all live streams under a domain name. In such way, return-to-origin links of all the live streams is set to a fixed link. Although such way has a simpler structure, link redundancy is introduced simultaneously. For example, for a live stream with a large number of viewers, a delay index of the live stream is of great importance to a user satisfaction of an overall service. However, a fixed link is still employed, which introduces some intrinsic delay.

Another way of the return-to-origin operation is to employ a relatively flexible scheduling algorithm to design a separate upstream node of the return-to-origin operation for each live stream. Such way needs a central control system, the central control system is requested before the return-to-origin operation, and a node which is returned to may be determined based on a return value of the central control system. Such way introduces the central control system which is not a CDN system. However, dependency and coupling are introduced in a structure where the central control system interacts with the CDN, which is equivalent to introduce a risk. Secondly, such way needs to design an independent central control system, which has a high research and development cost. In addition, compared to performing the return-to-origin operation directly, a logic of requesting the central control system and then performing the return-to-origin operation causes a round-trip time consumption of a HyperText transfer protocol (HTTP) request, which causes a negative impact on a first frame index and the delay index.

That is, in the related art, performing the return-to-origin operation based on the fixed return-to-origin link may introduce the intrinsic delay, and the central control system needs to be introduced when the flexible scheduling algorithm is employed, which increases the cost.

In order to solve the above technical problems, the disclosure provides a method for scheduling a return-to-origin link. As illustrated in FIG. 1, the method includes the following actions at blocks S101 to S104.

At block S101, a custom data frame is constructed, and the custom data frame includes address information of a push stream node.

In detail, for example, in a live scenario, data generated when the performer pushes the live stream is generally delivered through a specific audio and video transmission protocol. Generally, in addition to providing encapsulation of audio and video data, the protocol also provides encapsulation of some custom data. Therefore, in embodiments of the disclosure, the custom data frame may be constructed by encapsulating the custom data, and the custom data frame includes an IP address and a live service address of a current node.

At block S102, the custom data frame is added to live data to be transmitted, and the live data is distributed by a first return-to-origin link to edge nodes which receive a play request of each user.

In detail, after the custom data frame is obtained, the custom data frame is added to the live data to be transmitted, and distributed to the edge nodes that receive the play request of the user by the first back-to-source link, such that the edge nodes that receive the play request of the user may cache the custom data frame for backup.

At step S103, employing a second return-to-origin link to perform return-to-origin operation is requested in response to detecting that a line traffic corresponding to any edge node in the edge nodes which receive the play request of each user exceeds a preset threshold, and the second return-to-origin link is shorter than the first return-to-origin link In detail, in case that it is detected that the line traffic corresponding to any edge node in the edge nodes which receive the play request of each user exceeds the preset threshold, it means that the line is congested. Such case may cause a large delay, and a poor viewing experience of the user. Therefore, in this case, performing the return-to-origin operation by employing the second return-to-origin link is requested. The second return-to-origin link is shorter than the first return-to-origin link. Thus, the return-to-origin operation is performed by a new link in case that the line is congested, which is benefit to reducing the delay and improving the user's experience of viewing the live.

At step S104, the live data transmitted by the first return-to-origin link and live data transmitted by the second return-to-origin link are integrated, and integrated live data is distributed to the user.

In detail, by integrating the live data transmitted by the first return-to-origin link and the live data transmitted by the second return-to-origin link, the integrated live data may be distributed to the user.

The disclosure provides the method and the apparatus for scheduling the return-to-origin link, the device and the storage medium. With the disclosure, the custom data frame is pre-constructed, the custom data frame is added to the live data to be transmitted, and the live data is distributed by the first return-to-origin link to the edge nodes which receive the play request of each user, and employing the second return-to-origin link to perform the return-to-origin operation is requested in response to detecting that the line traffic corresponding to any edge node in the edge nodes which receive the play request of each user exceeds the preset threshold. The second return-to-origin link is shorter than the first return-to-origin link, so the return-to-origin operation is performed through another new link in case that the line is congested, which is benefit to reducing the delay and improving the user's experience of viewing the live. With the disclosure, it may be realized that a short return-to-origin link is employed for nodes with a large number of viewers without introducing other central control system, which improves the user experience.

In some alternative embodiments, adding the custom data frame to the live data to be transmitted and distributing the live data by the first return-to-origin link to the edge nodes that receive the play request of each user, include:

obtaining a special data frame by adding the custom data frame to a header of the live data to be transmitted; and sending the special data frame to the edge node which receives the play request of the user by the first return-to-origin link in response to receiving the play request of the user, and caching the custom data frame in the special data frame by the edge node.

In detail, after the performer pushes the live stream, a custom data frame is constructed before all the data. The custom data frame includes an IP address and a live service address of the current node. The custom data frame is added to the header of the live data to be transmitted to obtain the special data frame. When a certain edge CDN node receives a viewing request from a user, the edge CDN node may request data from the upstream node by employing some fixing strategies. The data obtained in the return-to-origin operation includes the custom data frame and the audio and video data of the live stream pushed by the performer. The edge node caches the custom data frame for backup, filters the custom data frame out from the data, and then sends the audio and video data to the user who wants to view. In this way, the user may view the live.

In this way, the custom data frame is added to the header of the live data to be transmitted, the special data frame is sent to the edge node which receives the play request of the user by the first return-to-origin link upon receiving the play request of the user, and the edge node caches the custom data frame in the special data frame, such that a new return-to-origin link may be requested based on the address information carried in the cached custom data frame.

Figure 2:
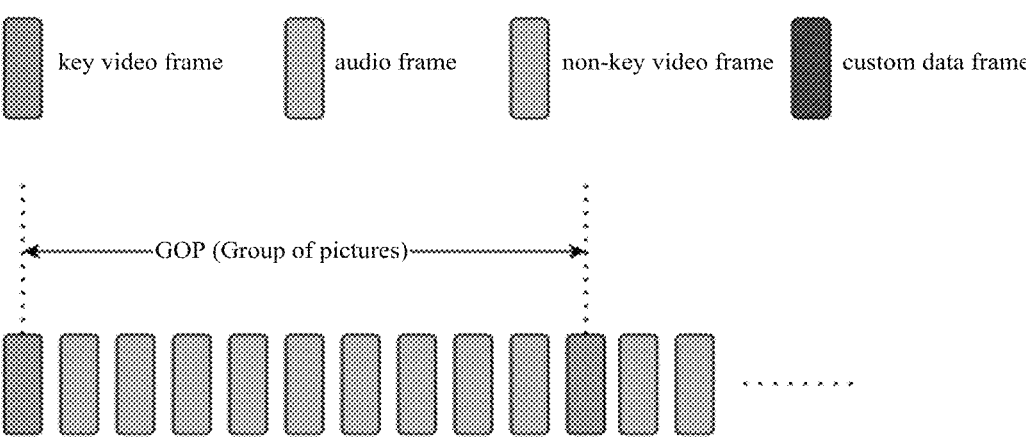
FIG. 2 is a schematic diagram illustrating constructing a custom data frame in embodiments of the disclosure.
Figure 2:
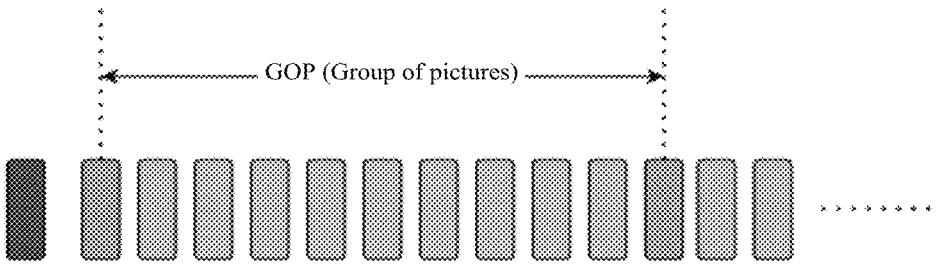
Figure 3:
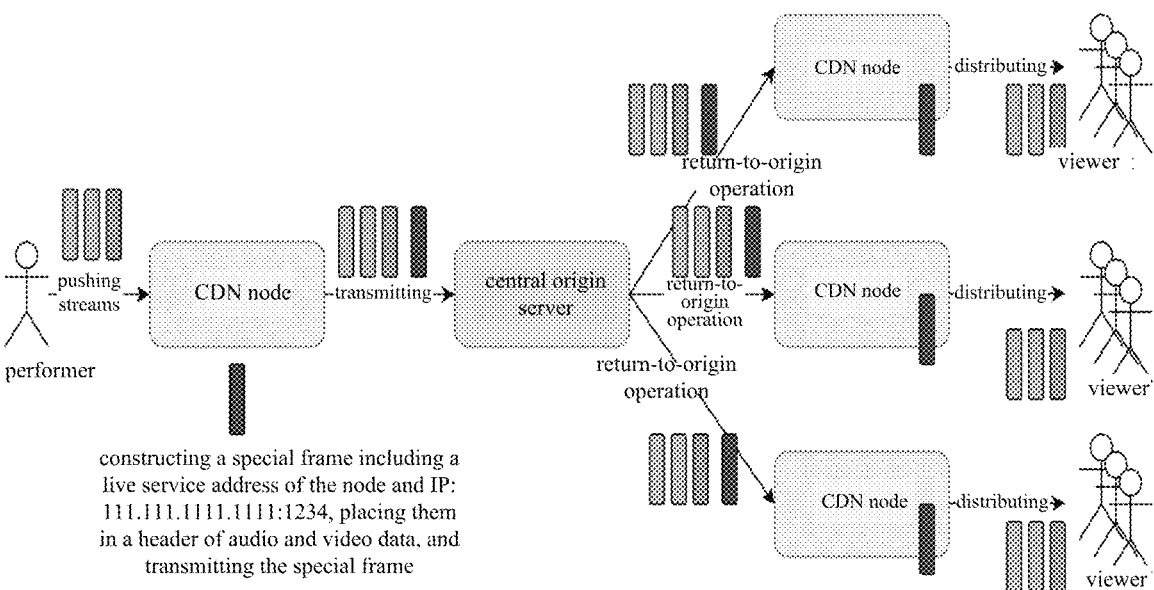
FIG. 3 is a schematic flowchart illustrating distributing a custom data frame to each edge node in embodiments of the disclosure.

To facilitate understanding of the solutions in embodiments of the disclosure, as illustrated in FIG. 2, FIG. 2 is a schematic diagram illustrating constructing a custom data frame in embodiments of the disclosure. The custom data frame includes the IP address and the live service address of the current node. After the custom data frame is constructed, as illustrated in FIG. 3, FIG. 3 is a schematic flowchart illustrating distributing a custom data frame to each edge node in embodiments of the disclosure. In the schematic flowchart, firstly, in order to push the live stream, the performer sends the audio and video data to a push CDN node, and the custom data frame is constructed. The custom data frame includes the live service address and the IP address of the push CDN node (i.e., 111.111.1111.1111: 1234). The custom data frame is placed in the header of the audio and video data and transmitted to the origin, and the edge CDN nodes which receive the play request of each user may request stream data from the origin and then distribute the stream data to the viewer of the live. In this case, the edge CDN node which receives the play request of the user caches the custom data frame, and filters the custom data frame out from the stream data. Finally, the audio and video data is sent to the viewer, and the viewers may view the live at this point.

In some alternative embodiments, requesting to employ the second return-to-origin link to perform the return-to-origin operation in response to detecting that the line traffic corresponding to any edge node in the edge nodes which receive the play request of each user exceeds the preset threshold includes:

requesting to employ the second return-to-origin link to perform the return-to-origin operation in response to detecting that a number of users corresponding to any edge node in the edge nodes that receive the play request of each user exceeds a preset number threshold.

In detail, the line traffic is determined based on the number of users. When the number of users exceeds the preset number threshold, it is considered that there are a relatively large number of users corresponding to the line, which may cause a large delay, and not be benefit to a viewing experience of the user. Therefore, the return-to-origin operation is performed through a new link in case that the line is congested, which is benefit to reducing the delay and improving the experience of the user viewing the live.

Figure 4:
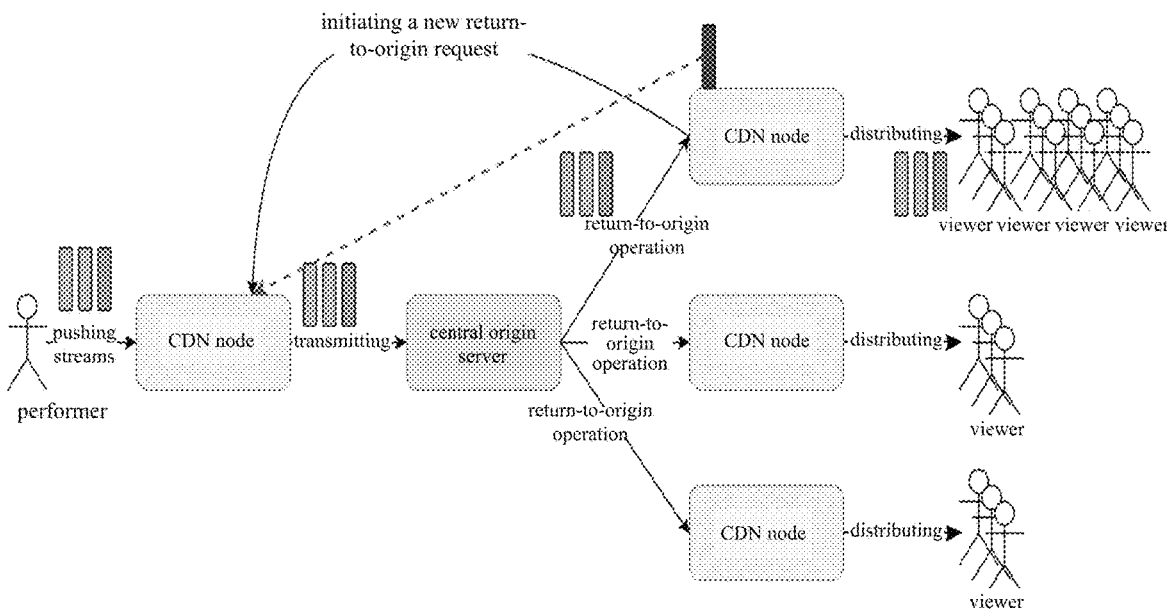
FIG. 4 is a schematic flowchart illustrating requesting a new return-to-origin link in embodiments of the disclosure.

In order to facilitate understanding of the solutions in embodiments of the disclosure, as illustrated in FIG. 4, FIG. 4 is a schematic flowchart illustrating requesting a new return-to-origin link in embodiments of the disclosure. In case that a first CDN node detects that there are too many viewers viewing the live in the first return-to-origin link, and the number of viewers exceeds the preset number threshold, a new link is initiated at this point.

In some alternative embodiments, requesting to employ the second return-to-origin link to perform the return-to-origin operation includes:

requesting the push stream node to employ the second return-to-origin link to perform the return-to-origin operation based on the address information of the push stream node included in the custom data frame cached in the edge node.

In this way, the address information of the push stream node included in the custom data frame may be cached in the edge node in advance, such that a new return-to-origin link request is initiated based on the address information without the aid of a third party (central control system), which reduces the research and development cost.

In some optional embodiments, the method further includes:

adding a special parameter to a request in response to requesting the push stream node to employ the second return-to-origin link to perform the return-to-origin operation, and requesting to obtain live data transmitted newly based on the special parameter carried in the request.

In this way, the request carries the special parameter in case that the push stream node is requested to employ the second return-to-origin link to perform the return-to-origin operation, which is benefit to determining a time point when a request instruction is issued.

In some alternative embodiments, integrating the live data transmitted by the first return-to-origin link and the live data transmitted by the second return-to-origin link, and distributing the integrated live data to the user, include:

receiving first data sent by the first return-to-origin link and second data sent by the second return-to-origin link; and integrating the first data and the second data, and distributing integrated live data to the user.

Figure 5:
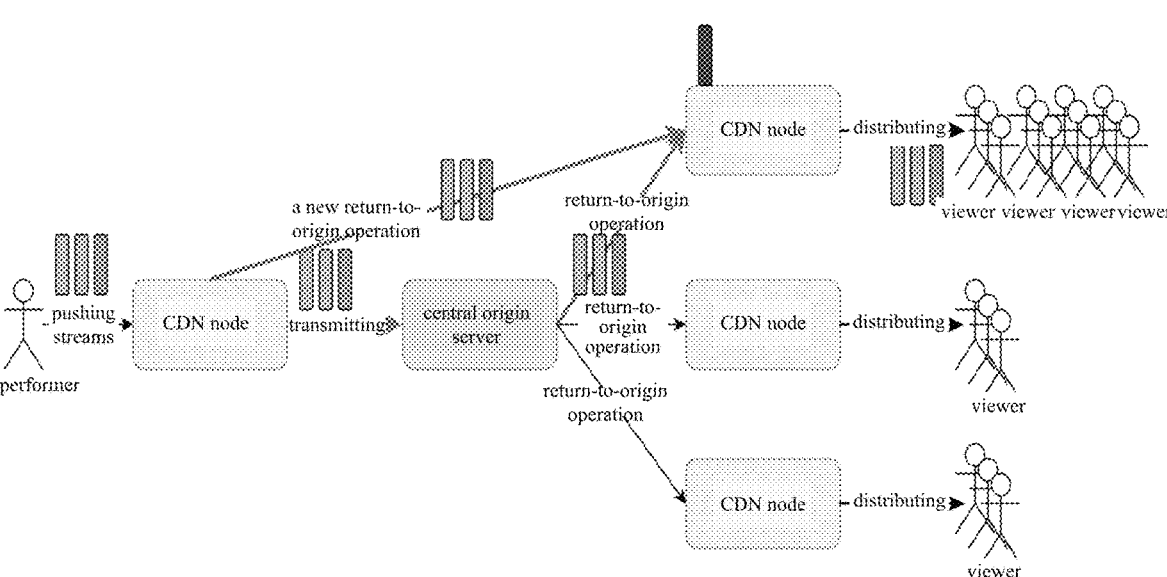
FIG. 5 is a schematic flowchart illustrating distributing live data by a first return-to-origin link and live data by a second return-to-origin link to a user in embodiments of the disclosure.

In detail, as illustrated in FIG. 5, FIG. 5 is a schematic flowchart illustrating distributing live data by a first return-to-origin link and live data by a second return-to-origin link to a user in embodiments of the disclosure. After the push stream node is requested to employ the second return-to-origin link to perform the return-to-origin operation, there is data of two return-to-origin links, i.e., the first data corresponding to the first return-to-origin link and the second data corresponding to the second return-to-origin link. The first data and the second data are integrated, which is benefit to ensuring the integrity of the transmitted live data, and ensuring the viewing experience of user.

In some alternative embodiments, receiving the first data sent by the first return-to-origin link and the second data sent by the second return-to-origin link includes:

caching the second data received from the second return-to-origin link while receiving the first data sent by the first return-to-origin link; and stopping performing return-to-origin link operation by the first return-to-origin link in response to a latest data frame obtained by the first return-to-origin link is a data frame requested by the second return-to-origin link.

In detail, the new link (also called the second return-to-origin link) has a low delay because the new link directly obtains the live data from the node where the performer pushes the live stream. However, in this case, there is a problem, that is, two copies of data may be obtained for a same live stream when the two return-to-origin links are running simultaneously. Thus, a de-duplication process is needed. Meanwhile, an old link (also called the first return-to-origin link) needs to be disconnected at an appropriate occasion while it is ensured that there is no extra audio and video data and no less audio and video data for the sent audio and video data, and the consistency of data sequence with data originally obtained is maintained, to enable the user not to sense the change. That is, special processing is needed to achieve a lossless switching.

Figure 6:
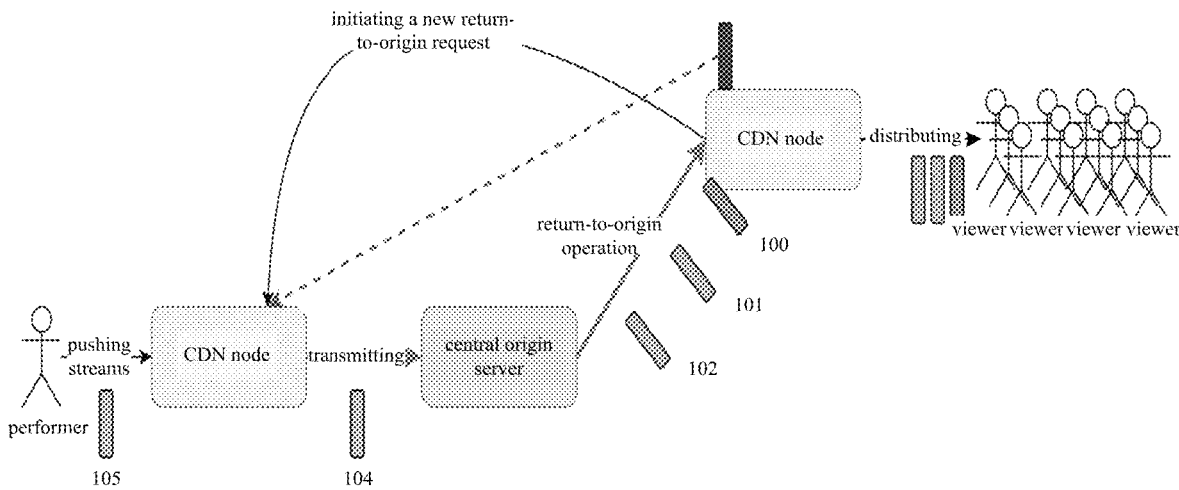
FIG. 6 is a schematic flowchart illustrating transmission of audio and video data of a live in embodiments of the disclosure.
Figure 7:
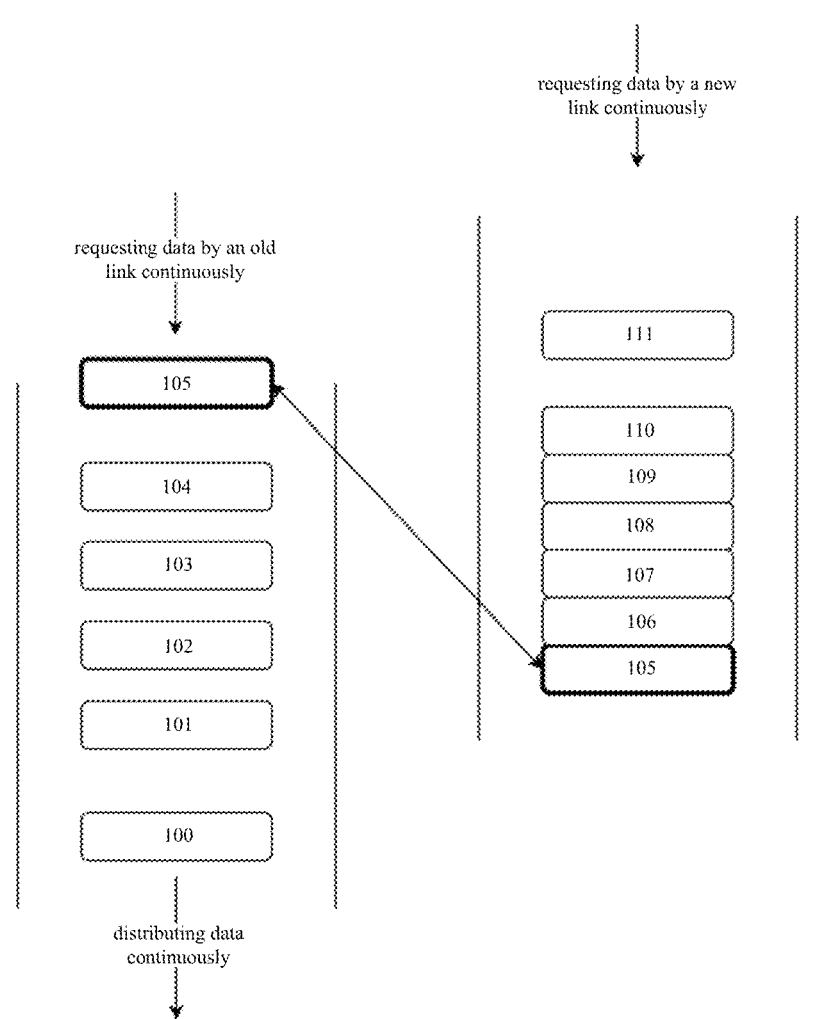
FIG. 7 is a schematic flowchart illustrating transmission of audio and video data of a live in another embodiment of the disclosure.
Figure 8:
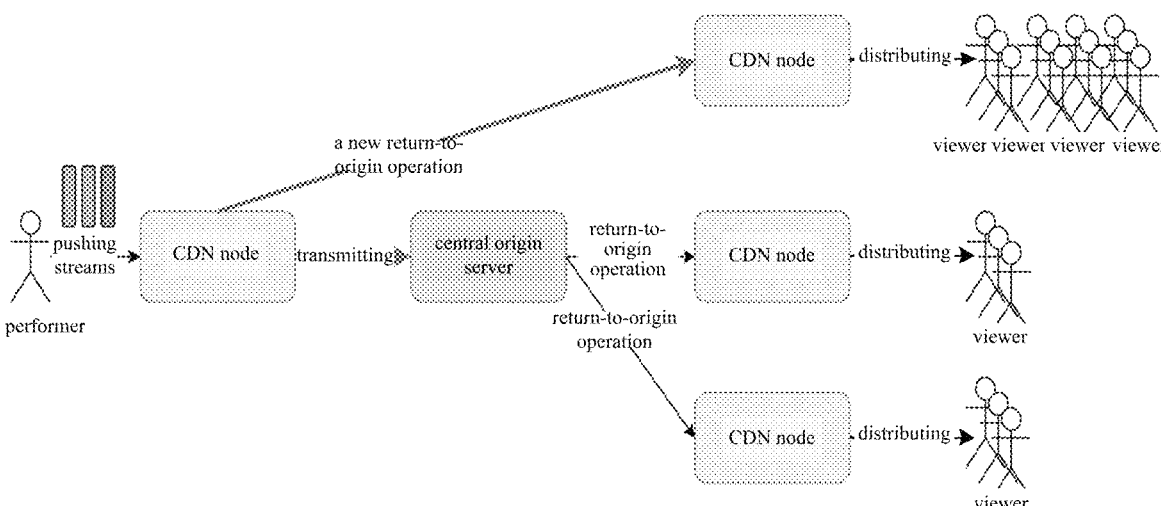
FIG. 8 is a schematic flowchart illustrating performing return-to-origin operation by a second return-to-origin link in embodiments of the disclosure.

In order to facilitate the understanding of the solutions in embodiments of the disclosure, an example is as follows. The audio and video data of the live is continuously generated and transmitted, with corresponding timestamps that indicate a sequence, referring to FIG. 6 and FIG. 7. FIG. 6 is a schematic flowchart illustrating transmission of audio and video data of a live in embodiments of the disclosure. FIG. 7 is a schematic flowchart illustrating transmission of audio and video data of a live in another embodiment of the disclosure. It is assumed that a timestamp of latest data returned from the central origin server by the old link is 100 when a new return-to-origin operation is initiated. Since data with timestamps 101, 102, 103 and 104 is still transmitted in the old link, a request for initiating the new return-to-origin operation needs to carry a special parameter that represents a desire of obtaining latest data. In this way, the push stream node starts to transmit data after a timestamp 105. For the node that handles the display request of the viewer, the live data are transmitted in the two return-to-origin links. Data transmitted in one return-to-origin link starts from the timestamp 100, and data transmitted on the other return-to-origin link starts from the timestamp 105. After the data on the two return-to-origin links is received, data transmitted on the new link is cached firstly, and data on the old link is distributed continuously. Requesting data in the old link is stopped until a latest video frame of the old link has already been transmitted by the new link. Data cached on the new link is transmitted directly, and data received afterward is transmitted transparently. As illustrated in FIG. 8, FIG. 8 is a schematic flowchart illustrating performing return-to-origin operation by a second return-to-origin link in embodiments of the disclosure.

It should be noted that there is a fixed interval (n ms) between each frame when the old link sends data starting from the timestamp 105. Since the new link is a shorter link, and data with timestamps from 105 to 110 in the FIG. 7 have already been obtained, all the data may be sent directly at once, which reduces the delay compared to the old link.

In this way, when the latest data frame of the first return-to-origin link has been also returned by the second return-to-origin link, requesting the data by the first return-to-origin link is stopped, which ensures data lossless switching and avoids affecting the viewing experience of the user.

In this way, with the above method, without introducing other systems, it may be implemented that the node with the large number of viewers requests a short return-to-origin path, and the node with a small number of viewers requests a regular return-to-origin path. In this case, it may not only improve the viewing experience (lower delay) of multiple users in an area where the multiple users are located, but also not introduce excessive load to the node where the live stream is pushed is located. The reason is that, a pressure on a live service of the node where the live stream is pushed may be caused in case that all the viewing nodes request data from the node where the live stream is pushed, thereby affecting the quality of reception of the pushed live stream.

Description will be made below to an apparatus embodiment of the disclosure that may be configured to perform the method for scheduling the return-to-origin link in the above embodiments of the disclosure. Details not disclosed in embodiments of the disclosure related to the apparatus may refer to the embodiments of the method for scheduling the return-to-origin link described above in the disclosure.

Figure 9:
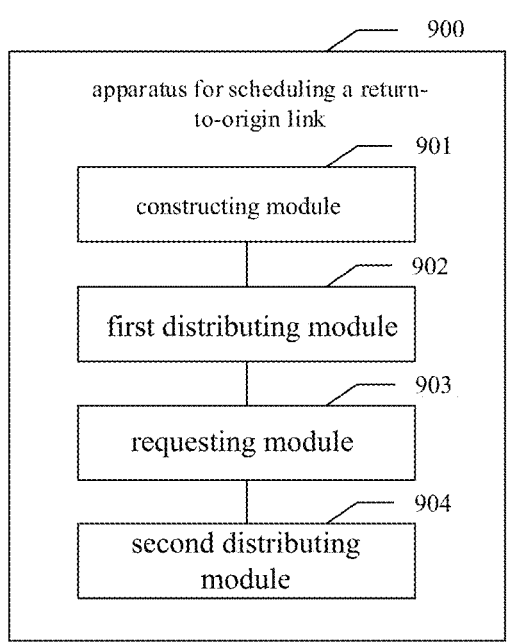
FIG. 9 is a block diagram illustrating an apparatus for scheduling a return-to-origin link in embodiments of the disclosure.

The disclosure further provides an apparatus 900 for scheduling a return-to-origin link. As illustrated in FIG. 9, the apparatus 900 includes:

a constructing module 901, configured to construct a custom data frame, the custom data frame including address information of a push stream node;

a first distributing module 902, configured to add the custom data frame to live data to be transmitted, and to distribute the live data by a first return-to-origin link to edge nodes which receive a play request of each user;

a requesting module 903, configured to request to employ a second return-to-origin link to perform return-to-origin operation in response to detecting that a line traffic corresponding to any edge node in the edge nodes which receive the play request of each user exceeds a preset threshold, the second return-to-origin link being shorter than the first return-to-origin link; and a second distributing module 904, configured to integrate the live data transmitted by the first return-to-origin link and live data transmitted by the second return-to-origin link, and to distribute integrated live data to the user.

In some alternative embodiments, the first distributing module 902 is configured to add the custom data frame to the live data to be transmitted, and to distribute the live data by the first return-to-origin link to edge nodes which receive the play request of each user, including:

obtaining a special data frame by adding the custom data frame to a header of the live data to be transmitted; and sending the special data frame to the edge node which receives the play request of the user by the first return-to-origin link in response to receiving the play request of the user, and caching the custom data frame in the special data frame by the edge node.

In some alternative embodiments, the requesting module 903 is configured to request to employ the second return-to-origin link to perform the return-to-origin operation in response to detecting that the line traffic corresponding to any edge node in the edge nodes which receive the play request of each user exceeds the preset threshold, including:

requesting to employ the second return-to-origin link to perform the return-to-origin operation in response to detecting that a number of users corresponding to any edge node in the edge nodes that receive the play request of each user exceeds a preset number threshold.

In some alternative embodiments, the requesting module 903 is configured to request to employ the second return-to-origin link to perform the return-to-origin operation, including:

requesting the push stream node to employ the second return-to-origin link to perform the return-to-origin operation based on the address information of the push stream node included in the custom data frame cached in the edge node.

In some alternative embodiments, the requesting module 903 is further configured to add a special parameter to a request in response to requesting the push stream node to employ the second return-to-origin link to perform the return-to-origin operation, and to request to obtain live data transmitted newly based on the special parameter carried in the request.

In some alternative embodiments, the second distributing module 904 is configured to integrate the live data transmitted by the first return-to-origin link and the live data transmitted by the second return-to-origin link, and to distribute integrated live data to the user, including:

receiving first data sent by the first return-to-origin link and second data sent by the second return-to-origin link; and integrating the first data and the second data, and distributing integrated live data to the user.

In some alternative embodiments, the second distributing module 904 is configured to receive the first data sent by the first return-to-origin link and the second data sent by the second return-to-origin link, including:

caching the second data received from the second return-to-origin link while receiving the first data sent by the first return-to-origin link; and stopping performing return-to-origin link operation by the first return-to-origin link in response to a latest data frame obtained by the first return-to-origin link is a data frame requested by the second return-to-origin link.

The obtaining, storage, and application of the personal information of the user involved in the technical solution of the disclosure are in compliance with relevant laws and regulations and do not violate public order and morals.

According to the embodiments of the disclosure, the disclosure also provides an electronic device, a readable storage medium, and a computer program product.

Figure 10:
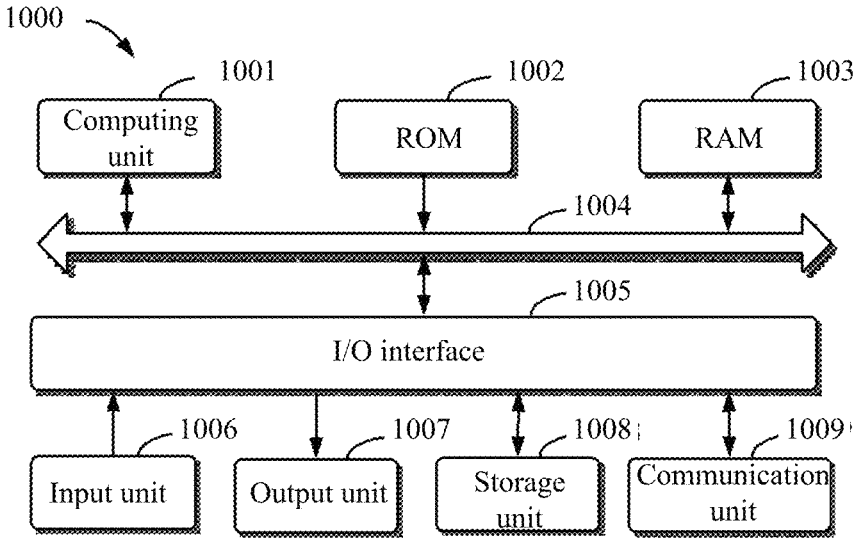
FIG. 10 is a block diagram illustrating an electronic device for implementing a method for scheduling a return-to-origin link in embodiments of the disclosure.

FIG. 10 is a block diagram illustrating an electronic device 1000 for implementing the embodiments of the disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital processors, cellular phones, smart phones, wearable devices, and other similar computing devices. The components illustrated here, their connections and relations, and their functions are merely examples, and are not intended to limit the implementations of the disclosure described and/or required herein.

As illustrated in FIG. 10, the device 1000 includes a computing unit 1001 for performing various appropriate actions and processes based on computer programs stored in a read-only memory (ROM) 1002 or computer programs loaded from a storage unit 1008 to a random access memory (RAM) 1003. In the RAM 1003, various programs and data required for the operation of the device 1000 are stored. The computing unit 1001, the ROM 1002, and the RAM 1003 are connected to each other through a bus 1004. An input/output (I/O) interface 1005 is also connected to the bus 1004.

Components in the device 1000 are connected to the I/O interface 1005, including: an input unit 1006, such as a keyboard or a mouse; an output unit 1007, such as various types of displays, or speakers; a storage unit 1008, such as a disk or an optical disk; and a communication unit 1009, such as a network card, a modem, or a wireless communication transceiver. The communication unit 1009 allows the device 1000 to exchange information/data with other devices through a computer network such as the Internet and/or various telecommunication networks.

The computing unit 1001 may be various general-purpose and/or dedicated processing components with processing and computing capabilities. Some examples of the computing unit 1001 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 1001 executes the various methods and processes described above, such as the method for scheduling the return-to-origin link. For example, in some embodiments, the method for scheduling the return-to-origin link may be implemented as computer software programs, which are tangibly included in a machine-readable medium, such as the storage unit 1008. In some embodiments, part or all of the computer programs may be loaded and/or installed on the device 1000 via the ROM 1002 and/or the communication unit 1009. When the computer programs are loaded on the RAM 1003 and executed by the computing unit 1001, one or more steps of the applet distribution described above may be executed. Alternatively, in other embodiments, the computing unit 1001 may be configured to perform the method for scheduling the return-to-origin link in any other suitable manner (for example, by means of firmware).

Various implementations of the systems and techniques described above may be implemented by a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. These various implementations may be implemented in one or more computer programs, the one or more computer programs may be executed and/or interpreted on a programmable system including at least one programmable processor. The at least one programmable processor may be a dedicated or general programmable processor for receiving data and instructions from the storage system, at least one input device and at least one output device, and transmitting the data and instructions to the storage system, the at least one input device and the at least one output device.

The program codes configured to implement the method of the disclosure may be written in any combination of one or more programming languages. These program codes may be provided to the processor or controller of a general-purpose computer, a dedicated computer, or other programmable data processing device, such that the program codes, when executed by the processor or controller, enable the functions/operations specified in the flowchart and/or block diagram to be implemented. The program codes may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may include or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, portable computer disks, hard disks, RAMS, ROMs, electrically programmable read-only-memories (EPROMs), flash memories, fiber optics, compact disc read-only memories (CD-ROMs), optical storage devices, magnetic storage devices, or any suitable combination of the foregoing.

In order to provide interaction with a user, the systems and techniques described herein may be implemented on a computer having a display device (e.g., a cathode ray tube (CRT) or a liquid crystal display (LCD) monitor) for displaying information to a user; and a keyboard and pointing device (such as a mouse or trackball) through which the user may provide input to the computer. Other kinds of devices may also be configured to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system (such as, a data server) that includes a background component, or a computing system (such as an application server) that includes a middleware component, or a computing system (such as, a user computer with a graphical user interface or a web browser, through which the user may interact with the implementation of the systems and technologies described herein) that includes a front-end component, or a computing system that includes any combination of the background component, the middleware computing component, or the front-end component. The components of the system may be interconnected by any form or medium of digital data communication (e.g., a communication network). Examples of the communication network include: a local area network (LAN), a wide area network (WAN), and the Internet.

The computer system may include a client and a server. The client and server are generally remote from each other and interacting with each other via a communication network. A client-server relation is generated by computer programs running on a respective computer and having a client-server relation with each other. The server may be a cloud server, a server of a distributed system, or a server combined with a block-chain.

It should be understood that the various forms of processes shown above may be used to reorder, add or delete steps. For example, the steps described in the disclosure could be performed in parallel, sequentially, or in different orders, as long as a desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions may be made based on a design requirement and other factors. Any modification, equivalent replacement and improvement made within the spirit and principle of the disclosure shall be included in the protection scope of the disclosure.

What is claimed is:

1. A method for scheduling a return-to-origin link, comprising:

constructing a custom data frame, the custom data frame comprising address information of a push stream node;

adding the custom data frame to live data to be transmitted, and distributing the live data by a first return-to-origin link to edge nodes which receive a play request of each user;

requesting to employ a second return-to-origin link to perform return-to-origin operation in response to detecting that a line traffic corresponding to any edge node in the edge nodes which receive the play request of the each user exceeds a preset threshold, the second return-to-origin link being shorter than the first return-to-origin link; and integrating the live data transmitted by the first return-to-origin link and live data transmitted by the second return-to-origin link, and distributing integrated live data to the each user.

2. The method of claim 1, wherein adding the custom data frame to the live data to be transmitted and distributing the live data by the first return-to-origin link to the edge nodes that receive the play request of the each user, comprise:

obtaining a special data frame by adding the custom data frame to a header of the live data to be transmitted; and sending the special data frame to the edge node which receives the play request of the each user by the first return-to-origin link in response to receiving the play request of the each user, and caching the custom data frame in the special data frame by the edge node.

3. The method of claim 1, wherein requesting to employ the second return-to-origin link to perform the return-to-origin operation in response to detecting that the line traffic corresponding to any edge node in the edge nodes which receive the play request of the each user exceeds the preset threshold comprises:

requesting to employ the second return-to-origin link to perform the return-to-origin operation in response to detecting that a number of users corresponding to any edge node in the edge nodes that receive the play request of the each user exceeds a preset number threshold.

4. The method of claim 3, wherein requesting to employ the second return-to-origin link to perform the return-to-origin operation comprises:

requesting the push stream node to employ the second return-to-origin link to perform the return-to-origin operation based on the address information of the push stream node comprised in the custom data frame cached in the edge node.

5. The method of claim 4, further comprising:

adding a special parameter to a request in response to requesting the push stream node to employ the second return-to-origin link to perform the return-to-origin operation, and requesting to obtain live data transmitted newly based on the special parameter carried in the request.

6. The method of claim 1, wherein integrating the live data transmitted by the first return-to-origin link and the live data transmitted by the second return-to-origin link, and distributing the integrated live data to the each user, comprise:

receiving first data sent by the first return-to-origin link and second data sent by the second return-to-origin link; and integrating the first data and the second data, and distributing integrated live data to the each user.

7. The method of claim 6, wherein receiving the first data sent by the first return-to-origin link and the second data sent by the second return-to-origin link comprises:

caching the second data received from the second return-to-origin link while receiving the first data sent by the first return-to-origin link; and stopping performing return-to-origin link operation by the first return-to-origin link in response to a latest data frame obtained by the first return-to-origin link is a data frame requested by the second return-to-origin link.

8. An electronic device, comprising:

at least one processor; and a memory, communicatively coupled to the at least one processor, wherein the memory is configured to store instructions executable by the at least one processor, and when the instructions are executed by the at least one processor, the at least one processor is configured to execute:

constructing a custom data frame, the custom data frame comprising address information of a push stream node;

adding the custom data frame to live data to be transmitted, and distributing the live data by a first return-to-origin link to edge nodes which receive a play request of each user;

requesting to employ a second return-to-origin link to perform return-to-origin operation in response to detecting that a line traffic corresponding to any edge node in the edge nodes which receive the play request of the each user exceeds a preset threshold, the second return-to-origin link being shorter than the first return-to-origin link; and integrating the live data transmitted by the first return-to-origin link and live data transmitted by the second return-to-origin link, and distributing integrated live data to the each user.

9. The electronic device of claim 8, wherein the at least one processor is configured to execute:

obtaining a special data frame by adding the custom data frame to a header of the live data to be transmitted; and sending the special data frame to the edge node which receives the play request of the each user by the first return-to-origin link in response to receiving the play request of the each user, and caching the custom data frame in the special data frame by the edge node.

10. The electronic device of claim 8, wherein the at least one processor is configured to execute:

requesting to employ the second return-to-origin link to perform the return-to-origin operation in response to detecting that a number of users corresponding to any edge node in the edge nodes that receive the play request of the each user exceeds a preset number threshold.

11. The electronic device of claim 10, wherein the at least one processor is configured to execute:

requesting the push stream node to employ the second return-to-origin link to perform the return-to-origin operation based on the address information of the push stream node comprised in the custom data frame cached in the edge node.

12. The electronic device of claim 10, wherein the at least one processor is further configured to execute: adding a special parameter to a request in response to requesting the push stream node to employ the second return-to-origin link to perform the return-to-origin operation, and requesting to obtain live data transmitted newly based on the special parameter carried in the request.

13. The electronic device of claim 8, wherein the at least one processor is configured to execute:

receiving first data sent by the first return-to-origin link and second data sent by the second return-to-origin link; and integrating the first data and the second data, and distributing integrated live data to the each user.

14. The electronic device of claim 13, wherein the at least one processor is configured to execute:

caching the second data received from the second return-to-origin link while receiving the first data sent by the first return-to-origin link; and stopping performing return-to-origin link operation by the first return-to-origin link in response to a latest data frame obtained by the first return-to-origin link is a data frame requested by the second return-to-origin link.

15. A non-transitory computer-readable storage medium having computer instructions stored thereon, wherein the computer instructions are configured to cause a computer to execute:

constructing a custom data frame, the custom data frame comprising address information of a push stream node;

adding the custom data frame to live data to be transmitted, and distributing the live data by a first return-to-origin link to edge nodes which receive a play request of each user;

requesting to employ a second return-to-origin link to perform return-to-origin operation in response to detecting that a line traffic corresponding to any edge node in the edge nodes which receive the play request of the each user exceeds a preset threshold, the second return-to-origin link being shorter than the first return-to-origin link; and integrating the live data transmitted by the first return-to-origin link and live data transmitted by the second return-to-origin link, and distributing integrated live data to the each user.

16. The non-transitory computer-readable storage medium of claim 15, wherein the computer instructions are configured to cause a computer to execute:

obtaining a special data frame by adding the custom data frame to a header of the live data to be transmitted; and sending the special data frame to the edge node which receives the play request of the each user by the first return-to-origin link in response to receiving the play request of the each user, and caching the custom data frame in the special data frame by the edge node.

17. The non-transitory computer-readable storage medium of claim 15, wherein the computer instructions are configured to cause a computer to execute:

requesting to employ the second return-to-origin link to perform the return-to-origin operation in response to detecting that a number of users corresponding to any edge node in the edge nodes that receive the play request of the each user exceeds a preset number threshold.

18. The non-transitory computer-readable storage medium of claim 17, wherein the computer instructions are configured to cause a computer to execute:

requesting the push stream node to employ the second return-to-origin link to perform the return-to-origin operation based on the address information of the push stream node comprised in the custom data frame cached in the edge node.

19. The non-transitory computer-readable storage medium of claim 18, wherein the computer instructions are configured to cause a computer to execute:

adding a special parameter to a request in response to requesting the push stream node to employ the second return-to-origin link to perform the return-to-origin operation, and requesting to obtain live data transmitted newly based on the special parameter carried in the request.

20. The non-transitory computer-readable storage medium of claim 15, wherein the computer instructions are configured to cause a computer to execute:

receiving first data sent by the first return-to-origin link and second data sent by the second return-to-origin link; and integrating the first data and the second data, and distributing integrated live data to the each user.

* * * * *